Patented Dec. 30, 1924.

1,521,384

UNITED STATES PATENT OFFICE.

JULIUS MARCUSSON, OF LICHTERFELDE, NEAR BERLIN, GERMANY, ASSIGNOR TO THEO. H. GARY, OF NEW YORK, N. Y.

METHOD OF MAKING OILPROOF CONCRETE BODIES.

No Drawing.  Application filed February 17, 1920. Serial No. 359,428.

*To all whom it may concern:*

Be it known that I, JULIUS MARCUSSON, a citizen of Germany, and resident of Lichterfelde, near Berlin, Germany, have invented certain new and useful Improvements in Methods of Making Oilproof Concrete Bodies, for which I have filed applications in Germany July 1, 1918, Serial M. 63497 VI/80b, and on April 8/1919, Serial M. 65352 VI/80b; in Great Britain, on July 30, 1920, granted March 31, 1921; British Patent 145,673; in Switzerland, on December 29/1919, Swiss Patent 91801, granted October 10/1921, and of which the following is a specification.

My invention refers to the art of making containers and in general hollow bodies such as the hulls of ships and the like from artificial materials, such as concrete, cement, mortar and the like and its particular object is a method for making such containers or hollow bodies impermeable to oils and fats. The invention further refers to the containers as such.

One has tried repeatedly to render concrete and similar materials and more especially the receptacles made therefrom impermeable to oil, fluorine compounds, waterglass and ceresite being used for this purpose without giving however any satisfactory result. According to the present invention, now, hollow bodies such as receptacles consisting of concrete, cement, mortar or the like are rendered oil-tight in a very simple and yet effective manner by coating them either on their inner surface or on both surfaces with artificial resins such as are obtained for instance by acting with formaldehyde on phenols or other cyclic compounds, care being taken to expose such coatings to the action of the air before oil is permitted to act upon them. The coatings of artificial resins on being exposed to the air for a certain time are rendered insoluble and in this state permanently resist the action of oils, either mineral oils or fatty oils. As a matter of course the coatings also render the concrete or other bodies absolutely waterproof. The fact that concrete and similar material include in their pores a large quantity of oxygen, is conductive in bringing about and accelerating the hardening of the coat to a highly resistable varnish or lacquer without the use of heat.

In carrying my invention into practice I prefer spreading the artificial resin in a liquid state or in solution on the surface of the container or other hollow body which shall be rendered oil-tight. I may, however, also mix the resin or the solution containing the resin with sand, kieselguhr or another suitable filling body, such as for instance fibrous material, the pasty mass thus obtained being then spread on the surface to be coated and if necessary fixed thereon by beating or pressing. In employing a mixture of artificial resin and a filling body of some suitable sort, I have found it advantageous to add some lime or other basic material, the mixture thus prepared offering the advantage of solidifying within a relatively short time. The coatings obtained in this manner present a great power of mechanical resistance, and are not only oil- and water- tight but are also resistive to dilute alcohol and to salt solutions, or if prepared without the addition of basic material, the coatings also resist the action of acids. In view of the fact that the admixtures made in accordance with my invention, consist of substances which will not dissolve in the same solvents as the original fresh coating or which are infusible therewith, they will not affect the fusibility, flexibility and viscosity of the original coating mixture properly speaking, so as not to interfere with its coating and permeating properties, or with its adhesiveness.

By applying my novel method to the hulls of ships made of concrete or a similar material the hulls are rendered absolutely water- and oil- tight and are less sensitive against shocks, their weight being not materially increased thereby. Furthermore coatings of the kind described applied to the outer skin of the hull will also act to diminish the friction in water.

A great number of methods for producing artificial resins from phenols or some other cyclic compounds and formaldehyde or the like have been described before and any person skilled in the art will know how to prepare them so that there is no need for giving a detailed description thereof.

I claim:

1. The process of oil-proofing and fat-proofing concrete articles and the like, which consists in coating such articles with a mixture of soluble and fusible artificial resinous condensation products of cyclic compounds with a filler, insoluble in said mixture, and including lime, and exposing said coated articles to the action of air at ordinary temperature and under normal pressure, and thereby hardening said mixture upon said articles.

2. The process of oil-proofing and fat-proofing concrete articles and the like, which process consists in coating such articles with a mixture of soluble and fusible artificial resinous condensation products of cyclic compounds with lime, and exposing said coated articles to the action of air at ordinary temperature and under normal pressure, and thereby hardening said mixture upon said article.

In testimony whereof, I affix my signature in the presence of two witnesses.

PROFESSOR DR. JULIUS MARCUSSON.

Witnesses:
  HERMANN MEISSINGER,
  FRITZ GARY.